March 9, 1926.

S. A. FOSTER 1,575,750

MEANS FOR DETERMINING THE TEMPERATURE OF INTERNAL COMBUSTION ENGINES

Filed March 21, 1925

Shubel A. Foster, INVENTOR.

BY S. E. Thomas

ATTORNEY.

Patented Mar. 9, 1926.

1,575,750

UNITED STATES PATENT OFFICE.

SHUBEL A. FOSTER, OF FERNDALE, MICHIGAN.

MEANS FOR DETERMINING THE TEMPERATURE OF INTERNAL-COMBUSTION ENGINES.

Application filed March 21, 1925. Serial No. 17,188.

*To all whom it may concern:*

Be it known that I, SHUBEL A. FOSTER, a citizen of the United States, residing at Ferndale, county of Oakland, State of Michigan, have invented a certain new and useful Improvement in Means for Determining the Temperature of Internal-Combustion Engines, and declare the following to be a full, clear, and exact description of the same, such as will enable others skilled in the art to which it pertains to make and use the same, reference being had to the accompanying drawings, which form a part of this specification.

My invention relates to a device adapted to be mounted upon an instrument board for indicating the temperature of the cooling medium circulating through the water jacket of an internal combustion engine, shown in the accompanying drawings and more particularly described in the following specification and claim.

Heretofore it has been customary to mount temperature indicators upon the radiator in place of the usual removable closure cap, to indicate the temperature of the motor.

It is well known however that devices of the type referred to do not function properly to show the temperature of the water or other cooling medium circulating through the jacket of the engine for the reason that the bulb of the thermometer is not always submerged in the cooling fluid and furthermore is more or less exposed to the cooling action of cold air striking the upper walls of the radiator in which it is supported.

A further objection to devices of this kind is that under the most favorable conditions they do not function until the engine has been operating for a considerable period— sufficient to produce a marked rise in the temperature of the chamber at the top of the radiator into which the bulb of the thermometer projects.

A further objection to devices of this character is that the water in the radiator may be frozen or its circulation otherwise impeded or obstructed due to a stoppage in the radiator or the pipes connecting the radiator with the water jacket of the engine cylinder without that fact being indicated.

A further objection to devices of this kind is that being mounted as they are upon the top of the radiator they become the ready prey of maliciously inclined persons who may seek to remove the motor meter or indicator from the radiator.

The present invention therefore is designed to provide a temperature indicator adapted to be mounted upon the instrument board where it may be readily inspected at all times by the driver of the car and be protected against theft.

A further object of the invention is to connect the indicator with the water jacket of the engine at a point relatively close to the instrument board that a comparatively short lead may connect it with the water jacket—another pipe connection being made between the device and the pipe leading from the radiator to the circulating pump. The object in thus installing the device is to insure a correct reading of the temperature of the cirulating cooling medium at all times and particularly that in the water jacket following the operation of the motor.

It will be apparent that the device will readily determine whether there is any stoppage of the passage through which the cooling medium circulates—as in the event of the circulating medium freezing in the radiator or stoppage occurring in the pipes leading from the radiator to the water jacket the water can not circulate and the indicator will not function. On the other hand in the case of devices mounted directly upon the radiator the water may be frozen or it may become low but this fact would not be determined from an inspection of the indicator. In the present device if the water runs low in the radiator, the indicator will register a higher temperature than normal due to the relatively small volume of cooling medium becoming superheated. If however the cooling medium should freeze in the radiator the indicator would not function at all and the operator would know at once that trouble was due to freezing or other stoppage of the pipes.

With the foregoing and other objects in view which will appear as the description proceeds the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1 is a diagrammatic view showing in side elevation an internal combustion engine, a radiator, water pipe connections leading to and from the radiator to the water jacket of the engine under the control of a pump, also the temperature indicator, supported in the instrument board and connected by piping with the water jacket of the engine and with the pipe connection between the radiator and the water pump.

Figure 1:
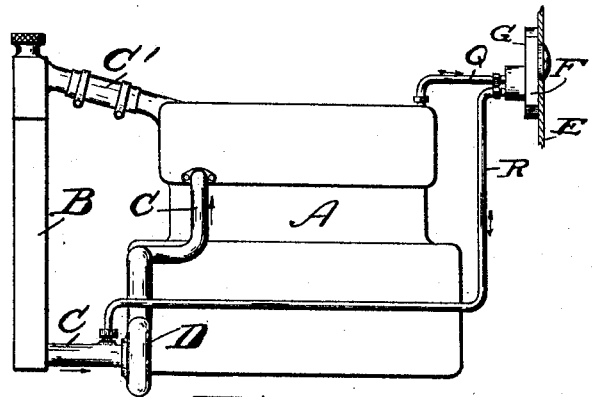
Figure 2:
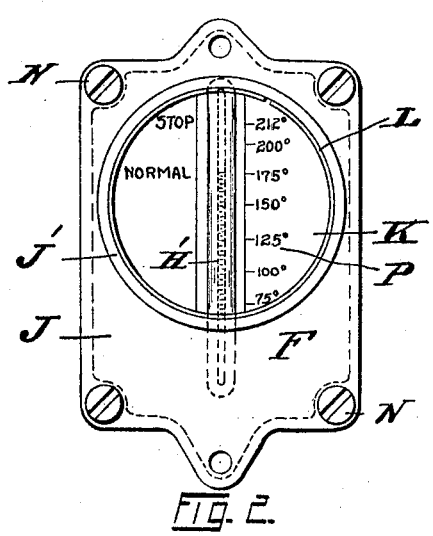
Figure 2 is a front elevation of the indicator.
Figure 3:
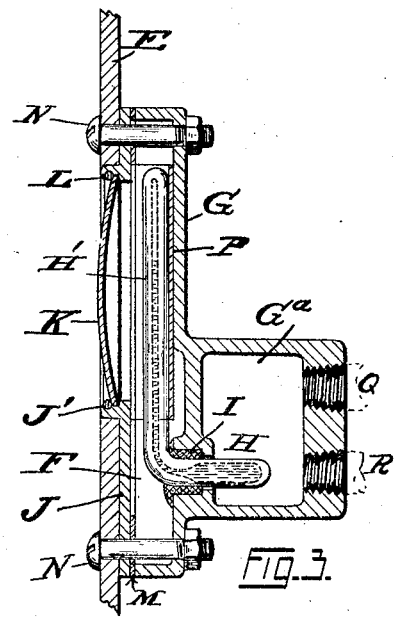
Figure 3 is a vertical sectional view through the indicator shown in Figure 2, secured to a fragment of the instrument board of an automobile.

Referring now to the letters of reference placed upon the drawings:—

A denotes an internal combustion engine—B a radiator of usual construction—C a circulating pipe leading from the bottom of the radiator to the water jacket of the engine—C¹ a pipe leading from the water jacket to the top of the radiator.

D indicates a pump in line with the pipe C, to insure a proper circulation of the water through the engine and radiator.

E denotes the instrument board of a motor vehicle.

F designates a temperature indicator secured to the instrument board comprising a frame G having a closed chamber G$^a$ into which the bulb H of a thermometer H¹ projects.

I represents a water seal of suitable material surrounding the tube of the thermometer in the partition wall of the closed chamber.

J denotes a cover plate having an annular flange J¹, in which is set a concavo-convex window or lens K.

L indicates a split ring lodged in a groove in the annular flange of the frame J adapted to overlap the window K, to secure the same against accidental dislodgement.

M designates a gasket inserted between the cover plate J and frame G.

N denote bolts projecting through the frame, the cover plate and instrument board to connect and secure the several parts together.

P indicates a graduated dial sheet or plate located between the stem of the thermometer and the rear wall of the device.

Q denotes a pipe leading from the water jacket of the engine to the closed chamber G$^a$ of the indicator.

R indicates a pipe leading from the closed chamber G$^a$ to the pipe C between the radiator B and the water circulating pump D.

Having now indicated the several parts by reference letters the construction and operation of the device will be readily understood:

Upon starting the engine water will circulate from the water jacket through the pipe Q into the closed chamber G$^a$ into which the bulb of the thermometer projects and thence out through the pipe R to the pipe connection C, between the radiator and water circulating pump—the water being forced by the latter back to the water jacket of the engine.

It will now be seen that unless the passage for the cooling medium is obstructed either by freezing or other cause the device will indicate the temperature of the water as it is in the water jacket of the engine, but if the passage through the radiator or pipe is obstructed it will be at once apparent as the indicator will not function.

While a thermometer comprising the usual tube and bulb has been shown it is evident that any device—adapted to be housed within the indicator frame—capable of measuring relative temperatures may be employed if preferred.

Having thus described my invention what I claim is:

In a device of the character described; an indicator frame adapted for attachment to the instrument board of a motor vehicle having an outwardly projecting closed chamber provided with inlet and outlet orifices; a thermometer tube supported in the wall of the indicator frame with its bulb extending into said closed chamber; means adapted to provide a water seal between the thermometer tube and the wall through which it extends; a cover plate having an opening surrounded by an annular rim; a glass window or lens fitted into said annular rim, through which a reading of the thermometer may be obtained; a split ring lodged in a peripheral groove formed in said rim, adapted to overlap the marginal edge of the window or lens, whereby the latter may be secured against accidental displacement; a graduated sheet lodged in said frame to provide a thermometer reading, and bolts extending through apertures provided in the frame and cover plate, to secure said frame and cover plate to the walls of an instrument board.

In testimony whereof, I sign this specification.

SHUBEL A. FOSTER.